No. 764,300. PATENTED JULY 5, 1904.
W. T. NICHOLLS.
GLASS MELTING FURNACE.
APPLICATION FILED FEB. 13, 1904.
NO MODEL. 3 SHEETS—SHEET 2.
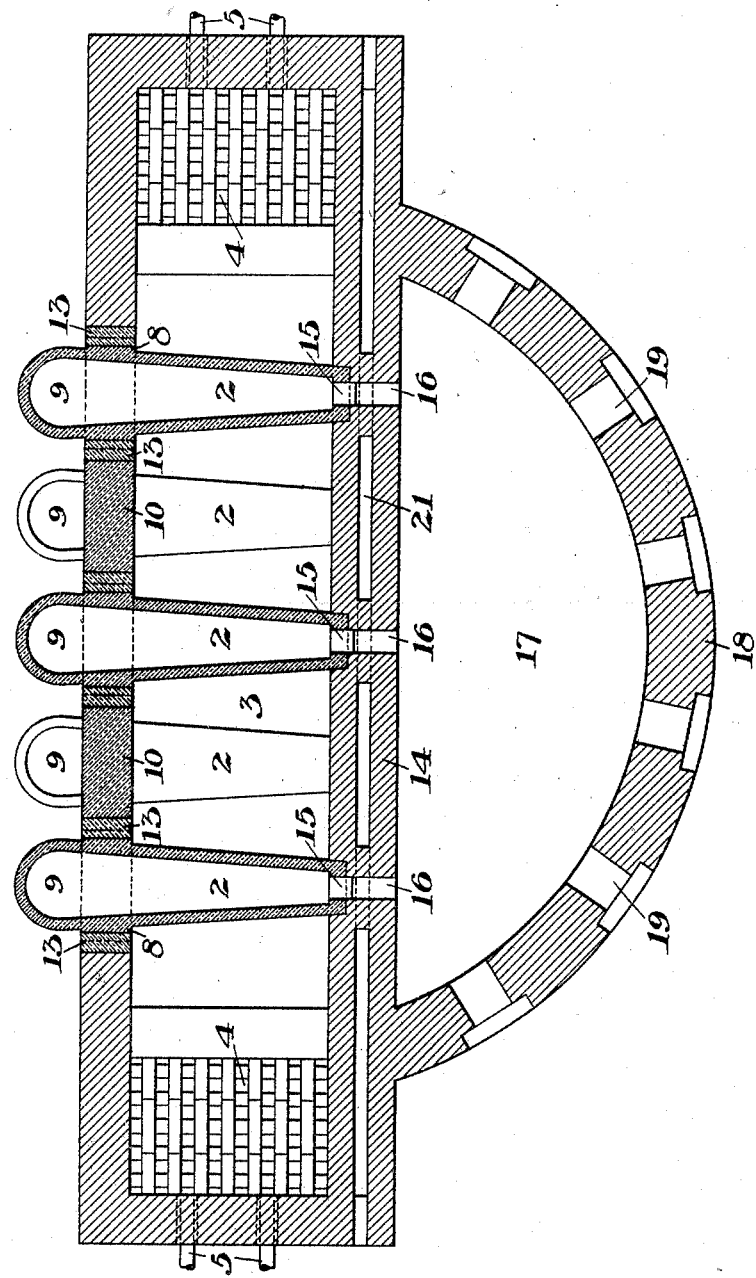
WITNESSES
INVENTOR

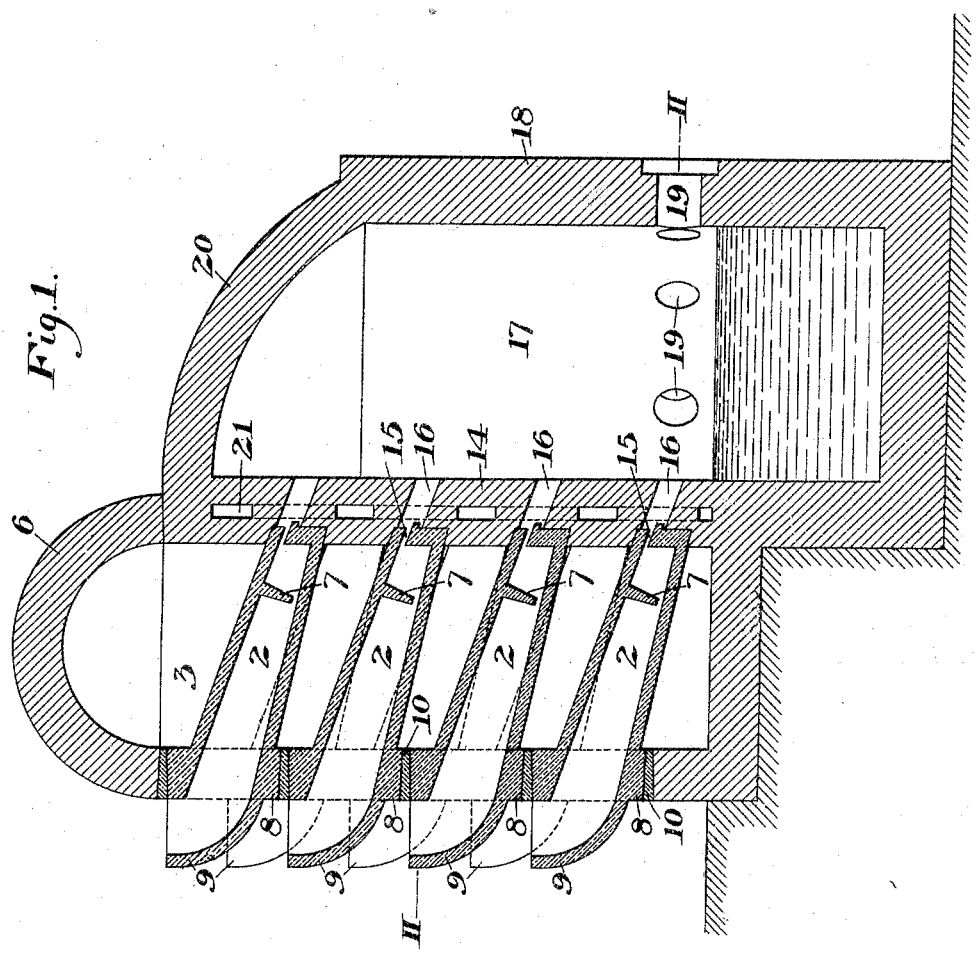

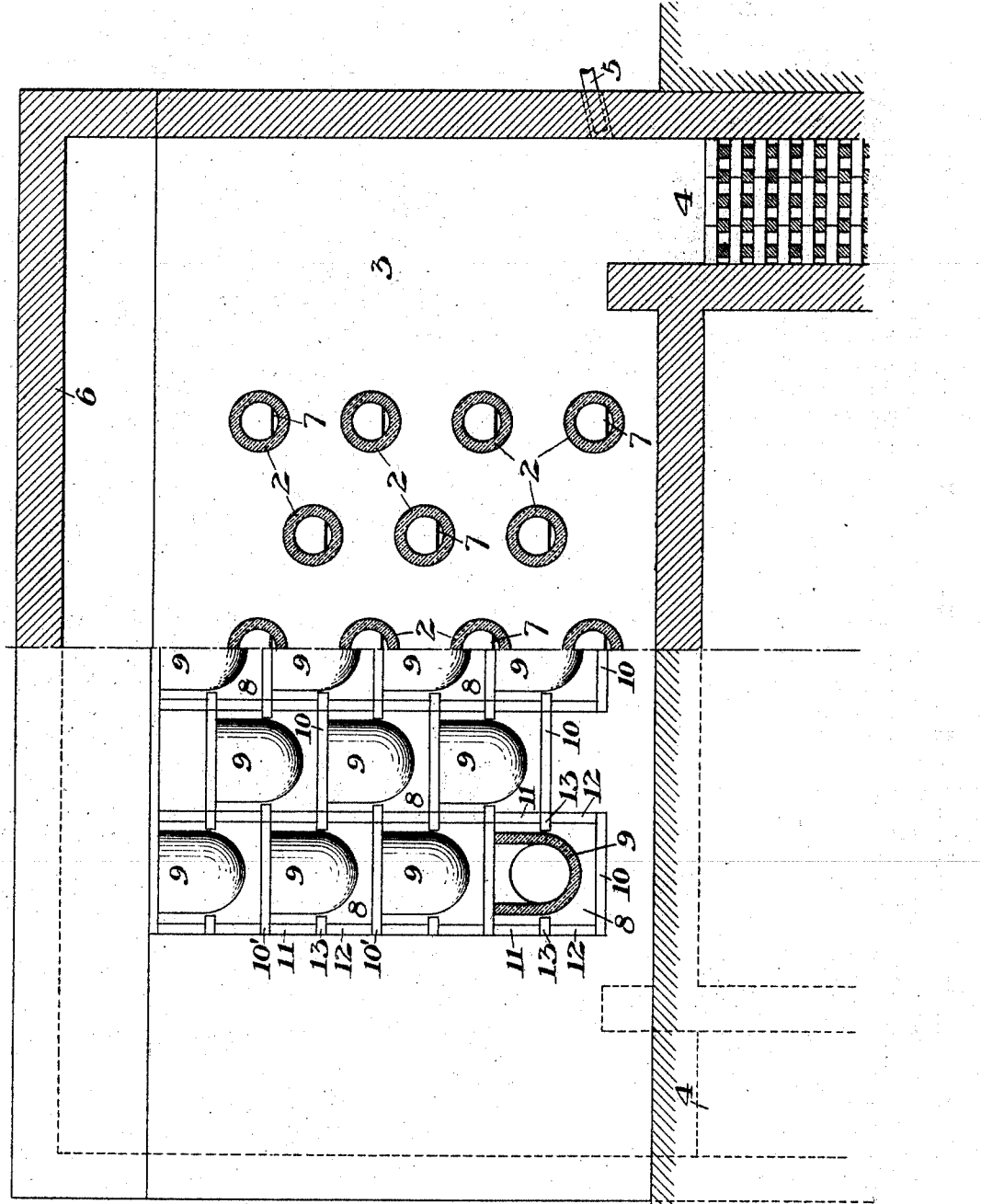

No. 764,300. Patented July 5, 1904.

UNITED STATES PATENT OFFICE.

WILLIAM T. NICHOLLS, OF WELLSBURG, WEST VIRGINIA.

GLASS-MELTING FURNACE.

SPECIFICATION forming part of Letters Patent No. 764,300, dated July 5, 1904.

Application filed February 13, 1904. Serial No. 193,384. (No model.)

*To all whom it may concern:*

Be it known that I, WILLIAM T. NICHOLLS, of Wellsburg, Brooke county, West Virginia, have invented a new and useful Glass-Melting Furnace, of which the following is a full, clear, and exact description, reference being had to the accompanying drawings, forming part of this specification, in which—

Figure 1 is a vertical cross-section of my improved furnace. Fig. 2 is a horizontal section on the line II II of Fig. 1. Fig. 3 is a front elevation of same, partly broken away, with one-half in vertical longitudinal section.

My invention relates to that class of glass-furnaces wherein the glass batch is melted in closed pots; and the object of the invention is to provide for a continuous operation of the pots or retorts, also to provide for feeding the glass from such retorts to a tank or work-out chamber from which it is taken for use.

A further object is to economize the heat in the melting operation and provide for easy removal and replacing of the pots or retorts.

In the drawings I show a series of retorts 2, which are set in vertical rows and extend transversely through a furnace-chamber 3. The pots of one vertical row are staggered relatively to those of the next row, so as to baffle the gases which flow from one end of the chamber to the other and are reversed in the ordinary manner of regenerative furnaces. I have illustrated regenerator-flues 4 4 at the ends of the chamber 3, which lead to air-regenerators, the gas being supplied through ports 5. The arrangement of the air and gas supply may be varied widely without departing from my invention.

The chamber 3 is provided with a roof 6 and is open at its front, where the retorts are inserted. The form of the retorts is shown in Figs. 1 and 2, they being inclined from the front to the rear wall of the chamber and provided with an intermediate depending bridge 7. At the front end each retort is formed integrally with a square block 8, which forms a part of the wall. In front of this block is the feed-in opening formed at the top of the projecting portion 9. In building the front wall the block 8 of the retort rests on a lower refractory slab 10, and at each side of the retort are fitted refractory slabs or blocks 11 and 12, with a smaller block 13 between them, which projects into a recess in the side portion of the block 8 of the retort. The blocks 10 are preferably of wedge form, as shown in Fig. 2, and the block 10' above each retort of the outer row extends to the block 13, which projects into the staggered retort of the next row. The block 10' of each intermediate row extends to the blocks 13 on each side thereof, these blocks entering the central portion of the block 8 in the retorts of the two adjacent rows. This construction enables me to readily remove any retort without disturbing the others by withdrawing the wedge-block beneath it and then drawing out the side blocks and pulling out the retort.

The back end of each retort is built into the rear wall 14 of the chamber 3 and its outlet-opening 15 registers with an inclined hole 16 in the rear wall, so that the glass which melts in the retort flows under the bridge and thence through the outlet-opening 15 into the port 16 and down the face of the wall 14. This wall 14 forms one wall of a semicircular work-out chamber 17, the arc-shaped wall 18 of which is provided with the usual work-out openings 19 above the level of the glass-bath therein. The work-out chamber is provided with an arched top 20. To keep the wall 14 from softening under the heat on both sides, I preferably cool this wall, as by tortuous air-passages 21 extending through it.

In operating the furnace the batch may be fed into the front openings of the retorts, and as it melts the glass flows into the work-out chamber and is taken therefrom in the ordinary manner.

The advantages of my invention result from the use of the inclined retorts which are arranged at different levels and which extract the heat from the gases more fully than that of prior constructions. The operation is continuous, the glass flowing from the several retorts into the tank-chamber, and any retort may be removed and replaced without disturbing the others above or below it or any adjacent rows.

Many changes may be made in the form and arrangement of the retorts, the heating system, and the chambers without departing from my invention.

I claim—

1. In a glass-furnace, the combination with a work-out chamber, of a series of retorts arranged to feed thereinto, and having external feed-in openings, a chamber surrounding the retorts and means for passing the flame and gases through said chamber; substantially as described.

2. A furnace-chamber, a series of retorts extending transversely of the same and having a feed-in opening at one end and an outlet-opening at the other end, means for passing the flame and gases through the furnace-chamber and around the retorts and a work-out chamber arranged to receive the glass from the retorts; substantially as described.

3. A furnace-chamber, a series of inclined retorts arranged transversely thereof and having feed-in openings at one end and outlet-openings at the other end, means for passing the flame and gases through the furnace-chamber and around the retorts and a working chamber arranged to receive the glass from the retorts; substantially as described.

4. A glass-furnace having glass pots or retorts extending transversely thereof and arranged at different levels, and means for passing flame and gases through the furnace and around the retorts; substantially as described.

5. A furnace-chamber having glass-melting retorts arranged in staggered vertical rows and extending transversely thereof, and a working chamber arranged to receive the glass from the retorts; substantially as described.

6. A furnace-chamber, retorts extending transversely thereof and set at different levels, supports for the retorts arranged to allow one of them to be withdrawn without disturbing the others, and a working chamber arranged to receive molten glass from the retorts; substantially as described.

7. A glass-tank having a wall on one side with openings, inclined retorts registering with the openings and containing partitions or baffles, a furnace-chamber inclosing the retorts and external feed-in openings for the retorts; substantially as described.

8. A furnace-chamber having superimposed retorts extending transversely thereof with external feed-in openings and blocks arranged to support the retorts independently of each other, and a working chamber arranged to receive the molten glass from the retorts; substantially as described.

In testimony whereof I have hereunto set my hand.

W. T. NICHOLLS.

Witnesses:
GEO. B. BLEMING,
JOHN MILLER.